(12) United States Patent
Ray

(10) Patent No.: US 11,210,455 B2
(45) Date of Patent: Dec. 28, 2021

(54) SHAREABLE AND CROSS-APPLICATION NON-DESTRUCTIVE CONTENT PROCESSING PIPELINES

(71) Applicant: Red Hat, Inc., Raleigh, NC (US)

(72) Inventor: Debarshi Ray, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 422 days.

(21) Appl. No.: 14/302,355

(22) Filed: Jun. 11, 2014

(65) Prior Publication Data

US 2015/0363373 A1    Dec. 17, 2015

(51) Int. Cl.
  *G06F 40/166*   (2020.01)
  *G06Q 10/10*   (2012.01)

(52) U.S. Cl.
  CPC ........ *G06F 40/166* (2020.01); *G06Q 10/101* (2013.01)

(58) Field of Classification Search
  CPC ............ G06F 17/241; G06F 17/30011; G06F 17/242; G06F 17/211; G06F 3/04883; G06F 17/212; G06F 17/30864; G06F 17/24; G06Q 10/101
  See application file for complete search history.

(56) References Cited

U.S. PATENT DOCUMENTS

| | | | |
|---|---|---|---|
| 6,181,836 B1 * | 1/2001 | Delean | G06T 3/00 345/428 |
| 7,495,667 B2 | 2/2009 | Bruggeman | |
| 7,620,665 B1 * | 11/2009 | George | G06F 17/303 |
| 7,996,427 B1 * | 8/2011 | Flick | G06F 17/30997 707/792 |
| 3,380,005 A1 | 2/2013 | Jonsson | |
| 9,369,635 B1 * | 6/2016 | Hilla | H04N 5/265 |
| 9,501,684 B1 * | 11/2016 | Krishnaswamy | G06K 9/00 |
| 9,560,157 B1 * | 1/2017 | Zuccarino | G06Q 30/0277 |
| 2004/0125130 A1 | 7/2004 | Flamini et al. | |
| 2004/0170374 A1 * | 9/2004 | Bender | G11B 27/031 386/232 |
| 2008/0013916 A1 * | 1/2008 | Sharpe | G11B 27/034 386/278 |
| 2008/0114795 A1 * | 5/2008 | Agrawal | G06F 40/197 |
| 2008/0193100 A1 * | 8/2008 | Baum | H04N 21/4825 386/281 |
| 2008/0256062 A1 * | 10/2008 | Dettinger | G06F 17/30525 |

(Continued)

OTHER PUBLICATIONS

Ormr—The Smart Image Editor, http://www.getormr.com/features/, downloaded Jun. 11, 2014, 2 pages.

(Continued)

*Primary Examiner* — Stephen S Hong
*Assistant Examiner* — Ahamed I Nazar
(74) *Attorney, Agent, or Firm* — Womble Bond Dickinson (US) LLP

(57) ABSTRACT

A method and system for providing shareable and cross-application non-destructive content processing pipelines. A set of non-destructive edits for a content item is received via a first content processing application, wherein the set of non-destructive edits includes a series of operations performed by a user on the content item. The set of non-destructive edits is stored in a shareable format. The set of non-destructive edits is exported in the shareable format, wherein the set of non-destructive edits is importable by a second content processing application different from the first content processing application.

20 Claims, 5 Drawing Sheets

(56) References Cited

U.S. PATENT DOCUMENTS

| | | | |
|---|---|---|---|
| 2009/0112808 A1* | 4/2009 | Howcroft | G06F 17/30038 |
| 2010/0077358 A1 | 3/2010 | Sugaya et al. | |
| 2011/0320421 A1* | 12/2011 | Lin | G06F 17/30144 |
| | | | 707/705 |
| 2012/0114309 A1* | 5/2012 | Gill | G06Q 30/0603 |
| | | | 386/281 |
| 2013/0085811 A1* | 4/2013 | Darden | G06Q 10/00 |
| | | | 705/7.38 |
| 2013/0330021 A1* | 12/2013 | Bansal | G06T 11/60 |
| | | | 382/309 |
| 2014/0006919 A1* | 1/2014 | He | G06F 40/169 |
| | | | 715/230 |
| 2014/0035950 A1* | 2/2014 | Jonsson | G06T 11/60 |
| | | | 345/629 |
| 2014/0050419 A1* | 2/2014 | Lerios | G06T 3/0056 |
| | | | 382/276 |
| 2014/0056540 A1* | 2/2014 | Hamburg | G06F 21/6218 |
| | | | 382/299 |
| 2014/0280463 A1* | 9/2014 | Hunter | H04L 67/10 |
| | | | 709/203 |
| 2014/0310345 A1* | 10/2014 | Megiddo | G06F 15/163 |
| | | | 709/204 |
| 2015/0074145 A1* | 3/2015 | Homer | G06F 17/30011 |
| | | | 707/772 |
| 2015/0248442 A1* | 9/2015 | Lerios | G06T 3/0056 |
| | | | 707/602 |
| 2015/0363373 A1* | 12/2015 | Ray | G06Q 10/101 |
| | | | 715/256 |
| 2016/0147722 A1* | 5/2016 | Hariharan | G06F 40/143 |
| | | | 715/255 |
| 2017/0257414 A1* | 9/2017 | Zaletel | H04L 65/604 |

OTHER PUBLICATIONS

Designer Pro X9, Xara, http://www.xara.com/eu/designer-pro/advanced/, downloaded Jun. 11, 2014, 24 pages.

Online Post Workflows for Virtually all Cameras and File Formats from HD Through 4K Spatial Resolution Onwards, retrieved from http://web.archive.org/web/20140611083741/http://cineform.com/products/gopro-studio-premium, Jun. 11, 2014, 2 pages.

* cited by examiner

SHAREABLE AND CROSS-APPLICATION NON-DESTRUCTIVE CONTENT PROCESSING PIPELINES

Embodiments of the present disclosure relate to non-destructive content edit sharing and, more particularly, to cross-application content edit sharing.

BACKGROUND

Non-destructive editing allows users to edit a content item such as without modifying the original content file. For example, a user can perform a series of operations (or set of edits), also known as a pipeline, to the content, undo or redo the operations, or combine simpler operations into more complex operations to achieve a desired result on the content item. These edits may be stored such that the edits can be reapplied to the content after the application is closed and restarted.

However, when a group of users is jointly editing a content item, challenges can arise in sharing the edits amongst the group. For example, if one of the users is using a certain content processing application to edit the content, other users that do not have access to that same content processing application may not be able to perceive and/or modify the edits performed by that user.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Figure 1:
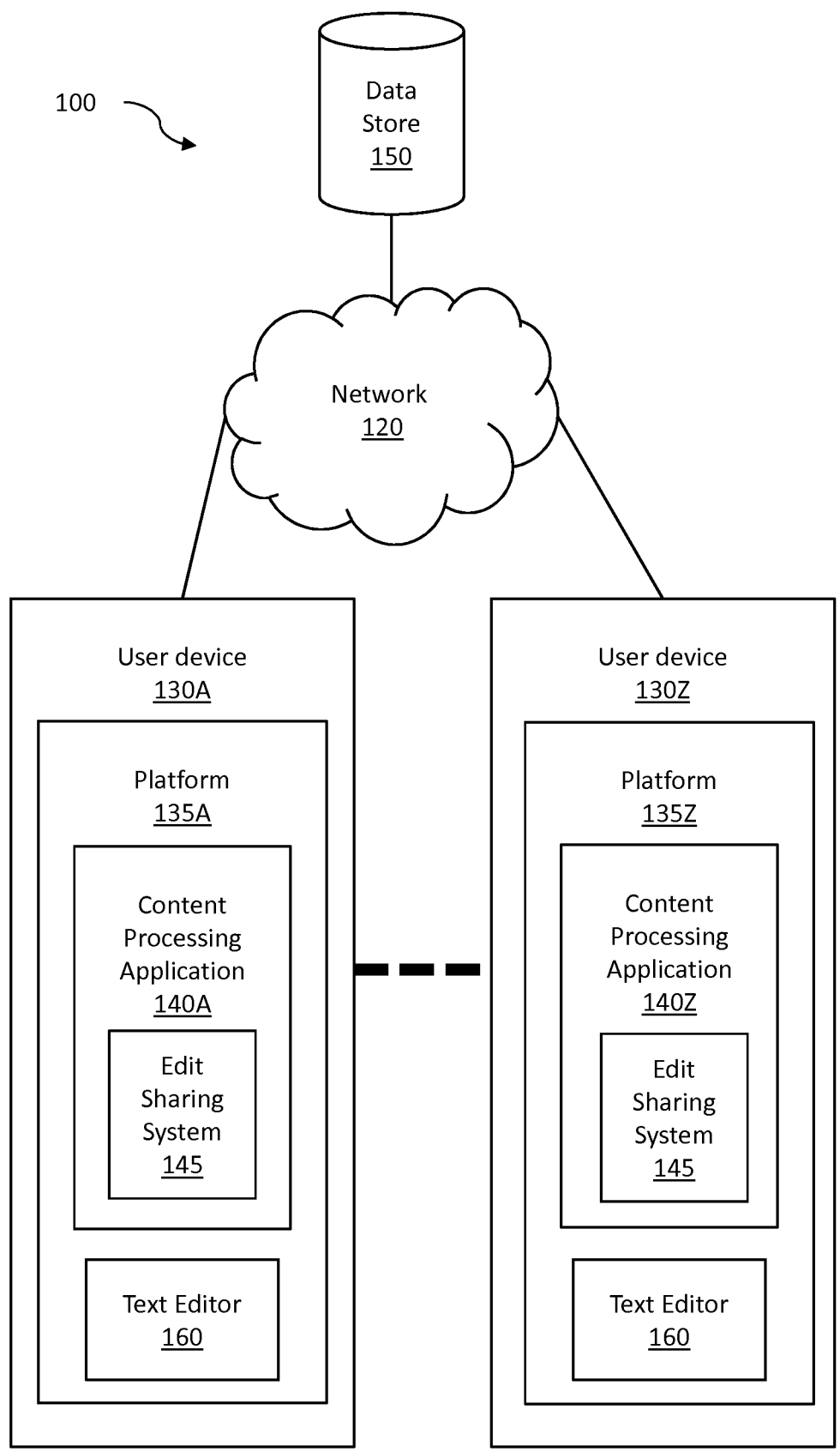
FIG. 1 illustrates exemplary system architecture, in accordance with various embodiments of the present disclosure.

Embodiments of the disclosure are directed to a method and system for providing shareable and cross-application non-destructive content processing pipelines. In an embodiment, a set of non-destructive edits for a content item, such as an image, a video, or audio content, is received via a content processing application. The set of non-destructive edits includes operations performed by a user on the content item. The set of non-destructive edits is stored and exported in a shareable format. The set of non-destructive edits is then importable by different content processing applications.

In an example, the content processing applications can be executed on different platforms. The set of non-destructive edits can be editable via a text editor and can be human-readable. The set of non-destructive edits can be stored independently from the content item.

Embodiments provide a solution for sharing the operations used to process a content item across multiple application and platforms in a human and machine readable format, such that operations can be reverted and replayed across multiple runs of the applications, operations can be combined together into more complicated operations, and operations can be saved or shared independent of the original image. In one embodiment, group editing of content items can be facilitated.

In an embodiment, a file format is provided for representing non-destructive content editing pipelines (e.g., edits performed on image content, audio content, video content, etc.) in an easily shareable format. Non-destructive editing is a form of editing where the original content is not modified in the course of editing. Rather, the edits can be performed, and a pointer-based playlist or database can keep track of the edits. Each time the edited content is rendered, played back, or accessed, the edited content is reconstructed from the original content and the editing steps. This process can be more computationally intensive than editing the original content at each step, but changing the edits can be fast, and generation loss as the audio, video, or image is edited can be avoided.

In an embodiment, the file format can be XML or JSON based. In an example, content processing applications can export sets of edits (or pipelines) to be stored in the file format, such that the sets of edits can be reused in other applications that may or may not be running on different platforms or operating systems. For example, a pipeline exported by Application A on a little-endian system (where the most significant byte of a word is stored in the smallest address) can be imported into an Application B on a big-endian system (least significant byte of a word in the smallest address).

In an embodiment, the file format can be both human-readable and machine-readable and can be a text file. For example, a user could manually view and modify a set of edits in a text editor, such that the results of modifying the set of edits would be discernable on a content item in a processing application.

Embodiments provide benefits including allowing users in different locations to easily collaboratively edit content items using different applications and platforms. Rather than needing to send the entire content items across a network to other users, embodiments allow for merely sending a small text file representing the user's edits. Further, embodiments allow a user to share a set of edits, similar to a recipe, in a way that can be read by both humans and machines. Additionally, a set of edits can be reused across multiple content items (e.g., a batch of similar images).

FIG. 1 shows a block diagram of a system architecture 100 according to one embodiment. In one embodiment, each of a plurality of user devices 130A-Z, such as personal computers, laptop computers, mobile devices, cellular telephones, personal digital assistants (PDA), etc., includes a respective operating system 135A-Z having a respective content processing application 140A-Z for editing content items (e.g., video content, image content, audio content, etc.). The user devices 130A-Z may be part of an organization's network. The user devices 130A-Z can be coupled to other user devices 130A-Z and a data store 150 via a network 120, which may be may be a private network (e.g., a local area network (LAN), a wide area network (WAN), intranet, or other similar private networks) or a public network (e.g., the Internet), or they may be directly coupled. Platforms 135A-Z may be the same or different platforms, and content processing applications 140A-Z may be the same or different content processing applications.

According to an embodiment, an edit sharing system 145 can be a module of each of the platforms 135A-Z or each of content processing applications 140A-Z, or the edit sharing system 145 can be a separate system operating on a different user device.

A user can utilize one of the user devices 130A-Z to perform a set of edits to a content item. For example, a user of user device 130A can perform a set of edits (e.g., a set of non-destructive edits) on a content item via content processing application 140A. The edit sharing system 145 receives the set of edits and can then store and export the set of edits. The edit sharing system 145 can be configured to communicate with various different content processing applications, including being configured to receive and translate edits from different content processing applications and being configured to send translated edits to different content processing applications. The set of edits could be stored on the user device 130A, or the set of edits could be stored in a different location such as a separate storage device (e.g., a hard drive, a thumb drive, a CD, a DVD, portable flash storage, etc.) or a location accessible to other users, such as the data store 150 (e.g., a centralized data store, cloud storage, networked storage, etc.).

In an embodiment, the set of edits can be stored and exported in a file format (e.g., a text file, a XML file, a JSON file, etc.) that can be edited in a text editor or other suitable editor. The set of edits can be stored separately from the file including the content item. In another embodiment, the file including the edits can be both machine-readable and human-readable, such that the user could view the file and modify the set of edits without opening the content item. Here, the set of edits is stored such that the user can recognize and understand the edits that were performed.

If the user desired to perform further edits to the content item or perceive the content item with the edits performed, the user could access the file including the set of edits via the content processing application 140A. The set of edits will then be performed on the content item, as stored, and the user will be able to perceive the edited content item. The user can then perform a new set of edits to the content item and this new set of edits can be stored. In embodiments, the user could save the new set of edits separately from the previous set of edits, save the new set of edits along with the previous set of edits, or keep a set of the previous edits in addition to saving the new set of edits with the previous set of edits.

In an embodiment, the user could share the set of edits with another user using user device 130Z with content processing application 140Z, which may be a different content processing application than 140A, running on platform 135Z, which may be different from platform 135A. For example, the user could make the set of edits available to the other user, e.g., via email, a shared storage location or data store, or any other suitable method of sharing data. In an example, the other user could already have access to the content item, such as by having the content item stored in a location accessible to user device 130Z (e.g., data store 150). Different platforms may correspond to different types of user devices (e.g., a mobile device and a desktop) and/or different operating systems. Different content processing applications may correspond to different versions of a content processing application that are available for different operating systems, or different types of content processing applications (e.g., video editing applications provided by different software vendors).

The other user could import the set of edits via content processing application 140Z. Next, the other user could perceive the edited content item, as edited by the initial user, by applying the set of edits to the content item. The other user could then perform additional edits on the content item via content processing application 140Z and store them with the previous set of edits or store the additional set of edits separately. The additional set of edits can be stored and exported by the edit sharing system 145. Alternatively, the other user could view and/or modify the set of edits, e.g, via a text editor 160, without importing the edits via a content processing application. The other user can then similarly share the additional set of edits with the initial user.

According to embodiments, users utilizing different content processing applications and/or different platforms can easily share sets of edits for a content item, apply sets of edits to multiple content items, store previous sets of edits as historical references, and effectively collaborate to achieve a desired edited content item.

Figure 2:
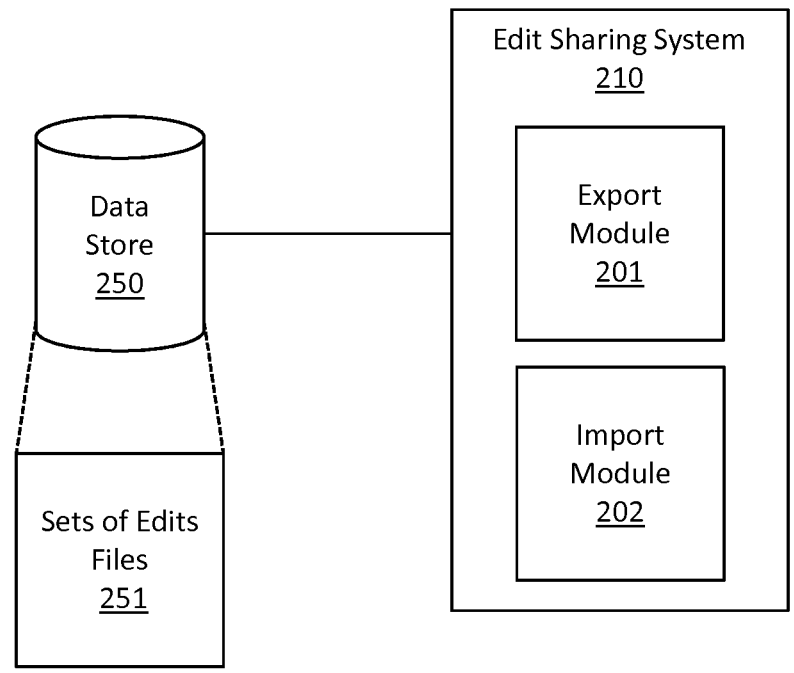
FIG. 2 illustrates a block diagram of an embodiment of an edit sharing system and a data store.

FIG. 2 illustrates an edit sharing system 210 and a data store 250 according to one embodiment. Here, the edit sharing system 210 can be the same as the edit sharing system 145 of FIG. 1, and the data store 250 can be the same as the data store 150 of FIG. 1. The developer guide system 210 includes an export module 201 and an import module 203. Note that in alternative embodiments, the edit sharing system 210 may include more or less modules than those shown in FIG. 2. Also, the export module 201 and the import module 203 may be combined into a single module. Additionally, the functionality of either the export module 201 or the import module 203 may be divided between multiple modules.

In one embodiment, the export module 201 receives an indication of a set of edits from a content processing application, such as an image processing application. For example, the export module can receive a listing of the operations performed by a user (e.g., an edit pipeline) during the editing of a content item. For an image content item, these operations could include brightness adjustment, cropping, sharpness adjustment, color adjustment, inserting features, removing features, saturation adjustment, adding filters, etc. For a video content item, these operations could include audio adjustment, removing segments, inserting features, adjusting playback speed, color adjustment, etc. For an audio content item, these operations could include volume adjustment, balance adjustment, fade adjustment, bass adjustment, treble adjustment, adding features, removing portions, dampening background noise, etc.

The export module 201 can store the set of edits that are performed by the user in data store 250. The export module 201 can also prepare the set of edits 251 for export. For example, the export module 201 can identify each of the operations that were performed and translate these operations to a corresponding name of an edit. The export module 201 can use a data structure (e.g., a database or a table) that stores identifiers of edit operations with corresponding names of edits. Identifiers of edit operations can be specific to (and different across) individual content processing applications while edit names can be uniform across individual content processing applications. Each of the corresponding names of edits can be added to a set of edits file 251, e.g., a text file, for export.

The corresponding names of each edit can be human readable. In an example of an edit to an image file, an adjustment of increasing a brightness level by 10 percent could be named "Increase brightness 10%". In another example, an adjustment of cropping an image 20 pixels narrower from the left side of the image could be named "Crop 20 pixels from left".

In an embodiment, the export module 201 can be configured to receive a set of edits from various different content processing applications and to translate the set of edits to corresponding edit names for inclusion in a set of edits file. For example, the export module 201 could search for each edit for a set of edits from a particular content processing application in a database including edits from that content processing application to determine a corresponding edit name.

Once the export module 201 has stored the set of edits file 251, the set of edits file 251 can be shared according to the desire of the user. A user can request that the set of edits file 251 be shared with another user or group of users by any suitable means, such as by email, flash drive, cloud storage, etc. In an example, where a group of users are editing a content item together, the file of the set of edits 251 may be stored in a location that can be accessed by all members of the group. In this example, members of the group may already have the content item (e.g., stored locally), since content items generally have very large file sizes resulting in the content item being difficult to share or upload. However, the set of edits file 251 is easily shared due to being a relatively small size.

The import module 202 on the user device of the other user with which the set of edits file 251 can import the set of edits file 251 into a content processing application, which may be a same or different content processing application than the content processing application used by the original user. Furthermore, the user device of the other user may have a different platform (or operating system) than the user device of the original user. In an example, the import module 202 can determine operations corresponding to the names of edits (e.g., via a database) that are listed in the set of edits file and cause the content processing application on the user device of the other user to perform the corresponding operation(s).

Further to the example above, if a first name of an edit is "Increase brightness 10%", then the import module 202 determines that a corresponding operation is to increase the brightness by 10 percent, find (e.g., in a data structure such as a table associated with the content processing application) an identifier of this operation as recognizable by the content processing application, and instruct the content processing application to do so using the found identifier. The other user can then perceive the content item with the edit performed.

The other user can also edit the content item further. For example, the other user can add a filter (e.g., "sepia filter") to content item. This new edit can then be added to the set of edits file, or stored as a separate new set of edits file.

Alternatively, the other user may directly edit the set of edits file. Here, the other user can open the set of edits file and adjust the names of edits such that corresponding operations will be adjusted or add new edits that correspond to new operations to be performed. Further to the example, the other user can change the name "Increase brightness 10%" to "Increase brightness 50%". The other user can then save the modified set of edits file, which could then be shared with other users.

Figure 3:
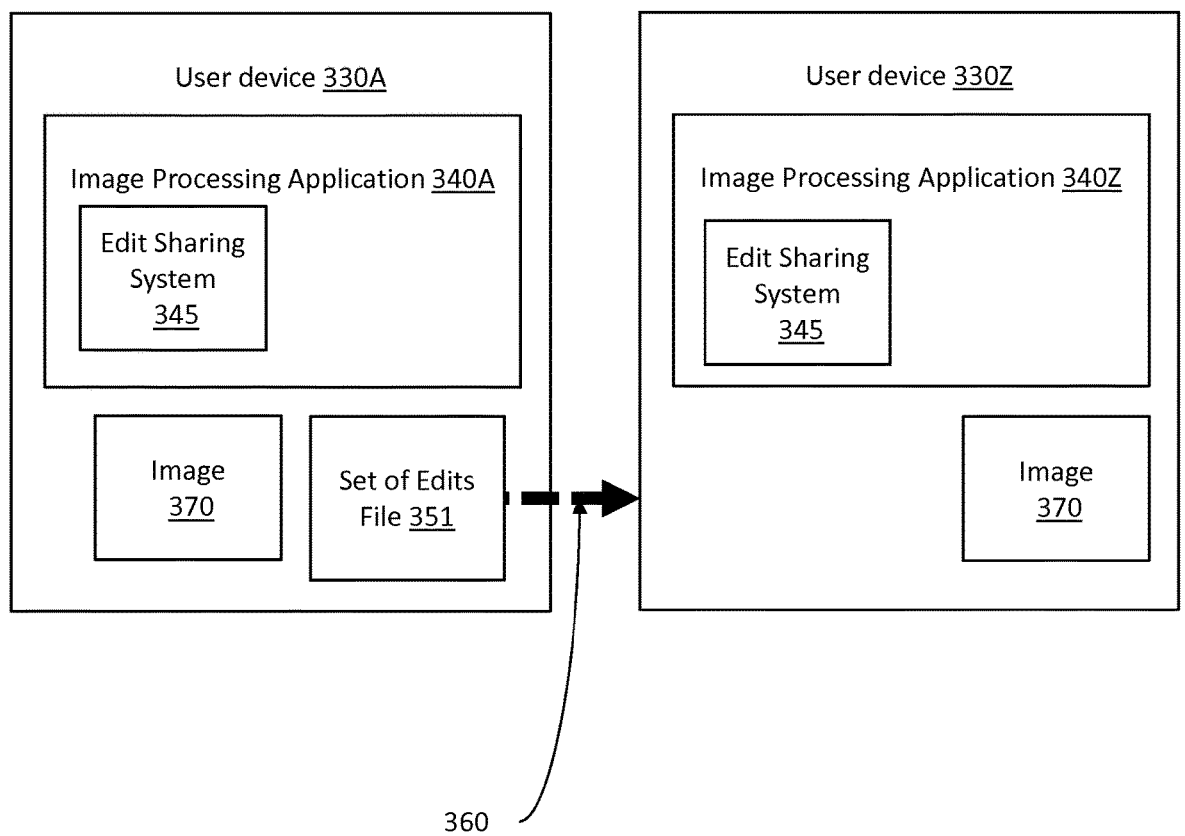
FIG. 3 illustrates sharing of a set of edits, according to one embodiment.

FIG. 3 illustrates an example of sharing of a set of edits, according to one embodiment. A user device 330A is a mobile device, such as a tablet, which has an image processing application 340A designed for use by mobile devices. In this example, the user of the mobile device captures an image 370 (e.g., a digital photograph) and uploads the image 370 to a cloud storage of the user's employer when the user has a fast connection to the cloud storage.

The user later edits the image 370 on the user device 330A by cropping the height and width of the image by 10 percent and erasing a portion of the image at position X. The user would like to share the edited image with a coworker that is using user device 330Z (e.g., a desktop computer) with a different image processing application 340Z that is designed for use by desktop computers. The coworker has access to the cloud storage to access the uploaded image 370 and downloads the image 370. However, the user no longer has a fast connection to the cloud storage.

To share the edited image, the edit sharing system 345 can prepare the edits for export as a set of edits file 351, e.g., a text file. The user can then share the relatively small file with the coworker. For example, the user can send 360 the set of edits file to the coworker via email.

The edit sharing system 345 on the user device 330Z can import the set of edits file 351 and determine the corresponding operations for the image processing application 340Z to perform on image 370. The edit sharing system 345 causes the image processing application 340Z to perform the operations on the image 370, such that the coworker can then perceive the edited image. Here, the coworker will see the image 370 cropped by 10 percent in height and width and with the portion at position X removed. The coworker can then further edit the image 370 via the image processing application 340Z such that the edits can be stored in a set of edits file or the coworker can edit the set of edits file directly.

Figure 4:
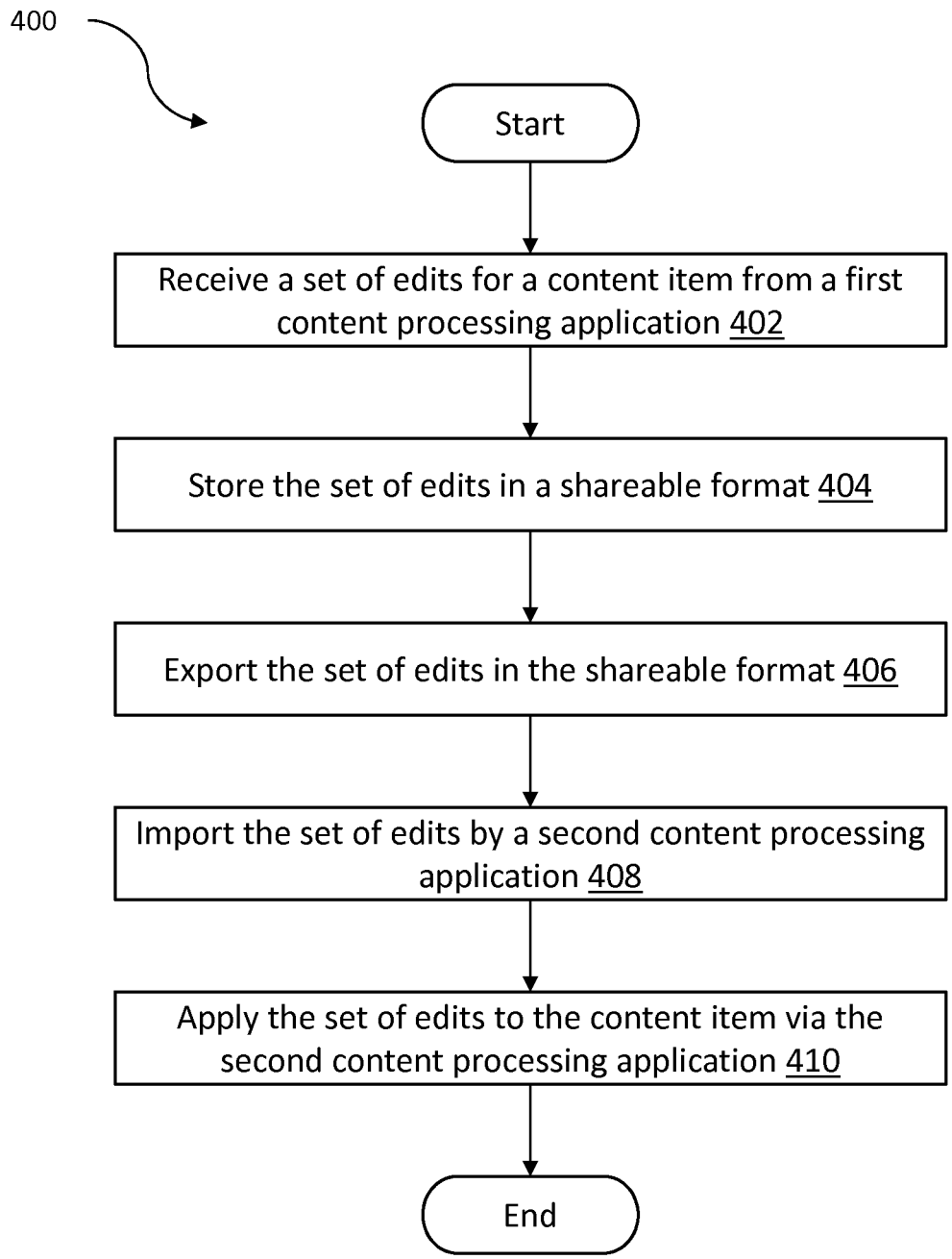
FIG. 4 illustrates a flow diagram of an embodiment of a method of sharing edits according to one embodiment.

FIG. 4 illustrates a method 400 of sharing edits according to one embodiment. The method 400 is performed by processing logic that may comprise hardware (circuitry, dedicated logic, etc.), software (such as is run on a general purpose computer system or a dedicated machine), or a combination of both. In one embodiment, the method 400 is performed by the edit sharing system 210 of FIG. 2.

At block 402, processing logic receives a set of edits for a content item from a first image processing application. In an embodiment, a user can perform a series of operations (e.g., a pipeline) to modify or edit a content item, such as an audio content item, an image content item, or a video content item. In an embodiment, the operations are performed in a particular order.

For example, a group of students in a visual arts class are working on a project to learn about image editing where they are to jointly edit an image using various image processing applications. The image is stored in cloud storage where all of the student can access the image, but the students are each using a different image processing application. Student A uses Image Processing Application A to perform a portion of the editing which includes two operations: decreasing brightness by 10 percent and adding a softening filter.

At block 404, processing logic stores the set of edits in a shareable format. In an embodiment, the set of edits can be stored as a text file, such as an XML file or a JSON file, which can be edited via a text editor. In an embodiment, a corresponding name for each of operations performed during the editing can be determined (e.g., via a database), and the names of the edits can be both human-readable and machine-readable. For example, a corresponding name of an edit could be determined for various different content processing applications, even though each of the content processing applications could use different terminology for a particular edit. The names of the edits can be standardized names to facilitate sharing of the edits between various different content processing applications.

Further to the example, the edits performed by Student A using Image Processing Application A are stored in a shareable XML file. The edits are stored in the shareable XML file as "decrease brightness 10%" and "add softening filter".

At block 406, processing logic exports the set of edits in the shareable format. In an embodiment, the set of edits is relatively easy to share because the file size of the file including the edits is relatively small, and likely much smaller than the file size of the content item. Therefore, the set of edits can be exported and shared via any suitable means, such as by email, storing in an accessible location, storing in cloud storage, etc.

Further to the example above, Student A can email the XML file including the set of edits to the other students in the group, including Students B and C.

At block 408, processing logic imports the set of edits by a second content processing application. For example, the second content processing application can be a different content processing application. However, because the set of edits was stored and exported in a shareable format, such as a text file, the set of edits can be implemented in the second content processing application, such that a user can perceive the edits performed by the first content processing application.

Further to the example above, Student B receives the email from Student A with the XML file including the set of edits. Student B then imports the set of edits from the XML file into Image Processing Application B.

At block 410, processing logic applies the set of edits to the content item via the second content processing application. In an embodiment, for each of the set of edits, a corresponding operation in the second content processing application can be determined. These operations can then be performed on the content item. Once the operations are performed on the content item, the edited content item can be perceived by a user.

Further to the example above, each of the set of edits in the XML file can be applied to the image via Image Processing Application B, such that Student B can view the edited image that Student A created using Image Processing Application A. Here, the edited image will have brightness decreased by 10 percent and will have a softening filter added.

Figure 5:
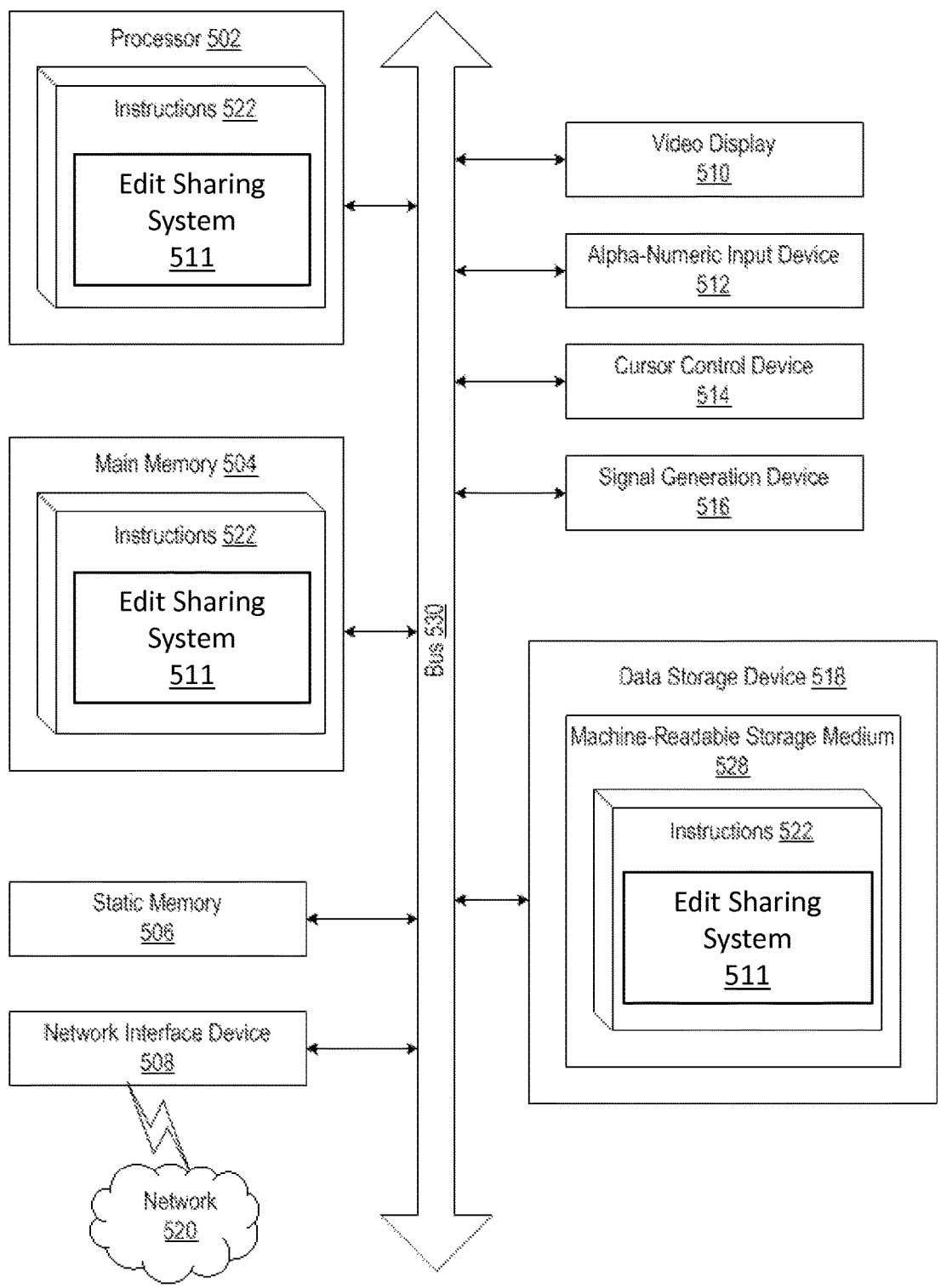
FIG. 5 illustrates a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for an edit sharing system 511 (e.g., edit sharing system 210 of FIG. 2). While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a set of non-destructive edits for a shared content item via a first content processing application associated with a first vendor, wherein each of the set of non-destructive edits comprises an operation that modifies at least one of audio content or video content of the shared content item;
   translating the set of non-destructive edits of the shared content item to corresponding edit names, wherein each corresponding edit name is uniform across the first content processing application and a second content processing application associated with a second vendor and independent from the first content processing application, and wherein each operation of each non-destructive edit is specific to the first content processing application and the second content processing application;
   storing, by the processing device executing the first content processing application, the set of non-destructive edits and the corresponding edit names in an edits file, wherein the edits file is in a shareable format, and wherein the non-destructive edits and the corresponding edit names stored in the edits file are in a human readable format and are editable by a user via a text editor; and
   exporting, by the processing device executing the first content processing application, the set of non-destructive edits in the shareable format, wherein the set of non-destructive edits is importable by the second content processing application and are applicable to the shared content item by the second content processing application as determined by the edit names and corresponding operation associated with the second content processing device.

2. The method of claim 1 further comprising importing the set of non-destructive edits in the shareable format via the second content processing application.

3. The method of claim 1, wherein the first content processing application is executed on a first platform and the second content processing application is executed on a second platform different from the first platform.

4. The method of claim 1, wherein the set of non-destructive edits is editable via a text editor.

5. The method of claim 1, wherein the set of non-destructive edits is stored independently from the shared content item.

6. A system comprising:
   a memory; and
   a processing device operatively coupled to the memory to:
      receive a set of non-destructive edits for a shared content item via a first content processing application associated with a first vendor, wherein each of the set of non-destructive edits comprises an operation that modifies at least one of audio content or video content of the shared content item;
      translating the set of non-destructive edits of the shared content item to corresponding edit names, wherein each corresponding edit name is uniform across the first content processing application and a second content processing application associated with a second vendor and independent from the first content processing application, and wherein each operation of each non-destructive edit is specific to the first content processing application and the second content processing application;
      store, by the processing device executing the first content processing application, the set of non-destructive edits and the corresponding edit names in an edits file, wherein the edits file is in a shareable format, and wherein the non-destructive edits and the corresponding edit names stored in the edits file are in a human readable format and are editable by a user via a text editor; and
      export, by the processing device executing the first content processing application, the set of non-destructive edits in the shareable format, wherein the set of non-destructive edits is importable by the second content processing application and applicable to the shared content item by the second content processing application as determined by the edit names and corresponding operation associated with the second content processing device.

7. The system of claim 6, wherein the processing device is further to import the set of non-destructive edits in the shareable format via the second content processing application.

8. The system of claim 6, wherein the first content processing application is executed on a first platform and the second content processing application is executed on a second platform different from the first platform.

9. The system of claim 6, wherein the set of non-destructive edits is editable via a text editor.

10. The system of claim 6, wherein the set of non-destructive edits is stored independently from the shared content item.

11. A non-transitory computer-readable storage medium comprising instructions that, when executed by a processing device, cause the processing device to:
 receive a set of non-destructive edits for a shared content item via a first content processing application associated with a first vendor, wherein each of the set of non-destructive edits comprises an operation that modifies at least one of audio content or video content of the shared content item;
 translate the set of non-destructive edits of the shared content item to corresponding edit names, wherein each corresponding edit name is uniform across the first content processing application and a second content processing application associated with a second vendor and independent from the first content processing application, and wherein each operation of each non-destructive edit is specific to the first content processing application and the second content processing application;
 store, by the processing device executing the first content processing application, the set of non-destructive edits and the corresponding edit names in an edits file, wherein the edits file is in a shareable format, and wherein the non-destructive edits and the corresponding edit names stored in the edits file are in a human readable format and are editable by a user via a text editor; and
 export, by the processing device executing the first content processing application, the set of non-destructive edits in the shareable format, wherein the set of non-destructive edits is importable by the second content processing application and applicable to the shared content item by the second content processing application as determined by the edit names and corresponding operation associated with the second content processing device.

12. The non-transitory computer-readable storage medium of claim 11, wherein the processing device is further to import the set of non-destructive edits in the shareable format via the second content processing application.

13. The non-transitory computer-readable storage medium of claim 11, wherein the first content processing application is executed on a first platform and the second content processing application is executed on a second platform different from the first platform.

14. The non-transitory computer-readable storage medium of claim 11, wherein the set of non-destructive edits is editable via a text editor.

15. The method of claim 1, wherein:
 the set of non-destructive edits comprises one or more of audio content item operations or video content item operations;
 the audio content item operations comprise at least one of volume adjustment, balance adjustment, fade adjustment, bass adjustment, treble adjustment, adding features, removing portions, or dampening background noise; and
 the video content item operations comprise at least one of audio adjustment, removing segments, inserting features, adjusting playback speed, or color adjustment.

16. The system of claim 6, wherein:
 the set of non-destructive edits comprises one or more of audio content item operations or video content item operations;
 the audio content item operations comprise at least one of volume adjustment, balance adjustment, fade adjustment, bass adjustment, treble adjustment, adding features, removing portions, or dampening background noise; and
 the video content item operations comprise at least one of audio adjustment, removing segments, inserting features, adjusting playback speed, or color adjustment.

17. The non-transitory computer-readable storage medium of claim 11, wherein:
 the set of non-destructive edits comprises one or more of audio content item operations or video content item operations;
 the audio content item operations comprise at least one of volume adjustment, balance adjustment, fade adjustment, bass adjustment, treble adjustment, adding features, removing portions, or dampening background noise; and
 the video content item operations comprise at least one of audio adjustment, removing segments, inserting features, adjusting playback speed, or color adjustment.

18. The method of claim 1 wherein the translating the set of non-destructive edits of the shared content item to corresponding edit names further comprises searching a data store to match each non-destructive edit and associated operation of the first content processing application with a corresponding non-destructive edit and associated operation of the second content processing application.

19. The system of claim 6 wherein to translate the set of non-destructive edits of the shared content item to corresponding edit names further comprises the processing device to search a data store to match each non-destructive edit and associated operation of the first content processing application with a corresponding non-destructive edit and associated operation of the second content processing application.

20. The non-transitory computer-readable storage medium of claim 11, wherein the processing device to translate the set of non-destructive edits of the shared content item to corresponding edit names the processing device is further to search a data store to match each non-destructive edit and associated operation of the first content processing application with a corresponding non-destructive edit and associated operation of the second content processing application.

* * * * *